United States Patent [19]
Woodcock

[11] 3,805,186
[45] Apr. 16, 1974

[54] UNITARY GLASS LASER ASSEMBLY

[75] Inventor: Richard F. Woodcock, South Woodstock, Conn.

[73] Assignee: American Optical Corporation, Southbridge, Mass.

[22] Filed: Nov. 29, 1972

[21] Appl. No.: 310,633

[52] U.S. Cl. .......................................... 331/94.5 E
[51] Int. Cl. .............................................. H01s 3/02
[58] Field of Search ................................... 331/94.5

[56] References Cited
UNITED STATES PATENTS
| | | | |
|---|---|---|---|
| 3,590,004 | 6/1971 | Woodcock | 331/94.5 |
| 3,626,319 | 12/1971 | Young | 331/94.5 |
| 3,646,472 | 2/1972 | Cooper et al. | 331/94.5 |

Primary Examiner—William L. Sikes
Attorney, Agent, or Firm—Bernard L. Sweeney; William C. Nealon

[57] ABSTRACT

A unitary laser rod configuration provides improved optical coupling between the flashlamps and the activated laser rod where the active substance in the laser rod is trivalent erbium ions. The components are arranged in a "double-U" laser configuration wherein the centrally located laser rod is surrounded by an annular cladding of sensitizing material. The core with its sensitizing cladding is then immersed in a clear glass outer cladding which forms the remainder of the unitary double-U configuration. This configuration provides optimal efficiency.

3 Claims, 3 Drawing Figures

3,805,186

UNITARY GLASS LASER ASSEMBLY

BACKGROUND OF THE INVENTION

This invention relates to light generating and light amplifying laser assemblies and the like of such new, improved, and carefully controlled construction and arrangement as to enable such assemblies to be more efficiently manufactured and assembled and more efficiently operated and maintained than has been possible heretofore in more or less comparable high efficiency laser devices of prior art design.

Trivalent erbium ions disposed in a glass host material characteristically emit laser energy at a wavelength of approximately 1.54 $\mu$m. One distinct advantage which adheres to the operation of a laser at this wavelength is that the human eye is quite absorbant to energy at this wavelength; therefore, natural protection against the burning of the retina is inherent in the erbium laser. This danger is less severe than with nearly all other known laser materials.

Erbium has, since its discovery as a laser material, proven to be a rather difficult material with which to acquire practical overall output efficiency when compared with other available laser material. Since trivalent erbium has very few absorption bands in the visible spectrum where the vast majority of the optical energy from a typical flashlamp is concentrated, it has proven to be impossible, practically speaking, to pump the erbium ions directly into a metastable upper energy level without the use of additional sensitizing ions. The customary sensitizing ions used with erbium ions have been a combination of trivalent neodymium and trivalent ytterbium ions. However, a problem was encountered with the combination since the trivalent neodymium ions tend to quench the trivalent erbium ions thereby preventing significant laser output. This problem was avoided by locating the trivalent neodymium sensitizer ions in a separate cladding layer surrounding the laser rod containing the trivalent erbium ions.

In addition, it is often necessary with glass laser assemblies, that the laser components be of a relatively small size and yet acquire sufficient ruggedness in order to withstand the rigors of ordinary handling. A series of unitary laser constructions which provide such ruggedness in a relatively small package are shown in U.S. Pat. Nos. 3,500,238 to Bazinet, Jr. et al; 3,626,319 to Young; and 3,646,472 to Cooper et al. All of these patents deal with a laser configuration in which the active ion embedded in the laser rod is trivalent neodymium and the laser rod is integrally surrounded by a clear cladding which either provides therein a bore in which flashlamp material may be emplaced or a recess in which a standard flashlamp may be seated.

Obviously, these prior art constructions do not directly lend themselves to use in a configuration where trivalent erbium is the active ion. The cladding which surrounds the laser component in the foregoing patents is, in all cases, a clear glass. If one were to attempt to dope this cladding glass with the sensitizer ions, one would encounter at least one significant problem. Some of the cladding material lies at a relatively great distance from the active laser core. If this material were to contain sensitizing ions, these sensitizing ions would absorb some of the energy emitted by the flashmap and would be unable to transmit this energy to the active ions in the laser core efficiently. Therefore, the overall efficiency of such a device would be very poor.

SUMMARY OF THE INVENTION

Accordingly, it is an object of the present invention to provide a rugged, unitary glass laser assembly utilizing an active laser ion which requires a sensitizing cladding wherein relatively high efficiencies may be attained.

Another object of the invention is to provide such a laser assembly in which a balanced thermal state is attained.

Briefly, the invention in its broadest aspect pertains to a rugged unitary glass laser assembly of the type wherein a relatively thin, rod-like glass laser component is enclosed along all sidewall portions thereof in an outer cladding of a compatible glass material. At least two similarly elongated flashtubes are snugly positioned parallel to and at regular intervals around the laser component in elongated recesses in the outer cladding so that the flashtubes form a balanced array around the laser component essentially the entire length thereof. The improvement in the foregoing laser assembly comprises an elongated annular sleeve of an intermediate cladding glass being interposed between the laser component and the outer cladding glass. The internal surface of the sleeve is disposed in intimate contacting relation with all parts of the sidewall portions of the laser component throughout the length thereof. Similarly, the external surface of the sleeve is disposed in intimate contacting relation with all parts of the internal sidewall portions of the outer cladding glass throughout substantially the length thereof. The intermediate cladding glass has an index of refraction which is very nearly equal to that of the glass laser component. The intermediate cladding glass material is a host for sensitizing ions. These sensitizing ions are absorbant to energy at various wavelengths which are emitted by the flashtubes and fluorescent at weavelengths at which the laser component is absorbant.

Further objects, advantages, and features of the invention will be apparent in the arrangement and construction of the constituent parts, in detail, as set forth in the following specification taken together with the accompanying drawing.

DETAILED DESCRIPTION OF THE PREFERRED EMBODIMENT

Figure 1:
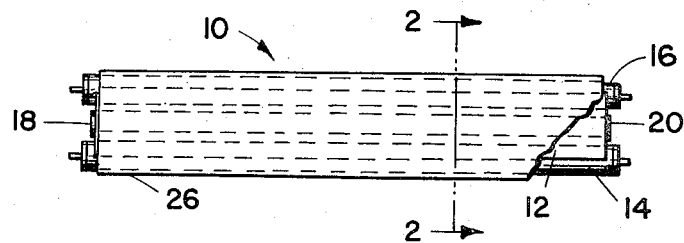
FIG. 1 is a partially broken away side elevation view of a rugged, unitary glass laser assembly according to the invention.

In examining the multiple views shown in the drawing, like reference numerals will be utilized to refer to identical parts.

Referring initially to FIG. 1, there is shown a rugged, unitary glass laser assembly 10 which is comprised of a centrally disposed unitary component 12 and two standard flashlamps 14 and 16 and a surrounding shield 26. It will be noted that the flashlamps 14 and 16 are parallel to and coextensive with the central unitary component 12.

Figure 2:
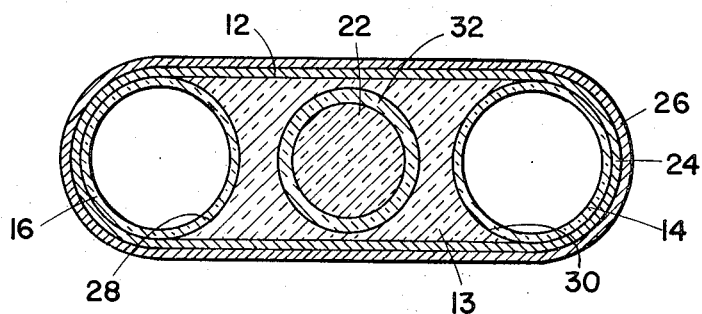
FIG. 2 is a greatly enlarged cross-sectional view of the glass laser assembly of FIG. 1 taken along line 2—2 thereof.
Figure 3:
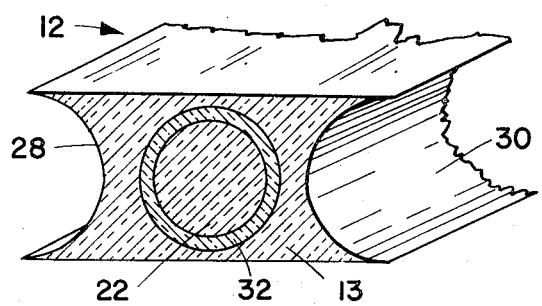
FIG. 3 is an oblique, sectional view of the three component central unitary structure shown in FIG. 2.

A more detailed examination of the components comprising the laser assembly 10 may be had by reference to FIGS. 2 and 3. The central unitary component 12 is further comprised of a relatively thin, elongated, rod-like glass laser component 22 which is centrally disposed within the unitary member 12. This component contains the active laser ions and is located within a resonant laser cavity established by reflecting means 18 and 20. These means are high reflective at the emission wavelength of the active material within the component 22. One of the means is somewhat less than 100 percent reflective to thereby allow the laser output to be emitted from the resonant cavity.

Surrounding the centrally disposed laser component 12 is an intermediate cladding glass material 32 formed as an elongated annular sleeve. The internal surface of the sleeve is disposed in a surrounding intimate contacting relation with the outer surface of the laser component throughout all parts of the sidewall portions thereof throughout the entire length of the laser component. This intermediate cladding contains the sensitizing ions, including neodymium and ytterbium in the case where erbium is the active laser ion within the laser component 22. In this manner, the sensitizing ions which can cause quenching of the active laser material are kept physically separate from the laser ions in order to prevent this quenching effect. The index of refraction of the intermediate cladding should be equal to or slightly greater than the laser component 22 to prevent total internal reflection at the interface.

Finally, surrounding both the laser component 12 and the intermediate cladding sleeve 32 is an outer cladding 13 of a clear glass material. The external surface of the intermediate cladding sleeve 32 is again disposed in an intimate contacting relation with all parts of the internal sidewall portions of the outer cladding glass throughout substantially the entire length thereof.

The flashlamps 14 and 16 are snugly seated against the component 12 in recesses 30 and 28 respectively which are formed in the outer cladding material 13. In cross-section, these recesses are essentially semicircular in configuration and are located on diametrically opposed sides of the laser component 22. It is, of course, within the purview of the invention, that additional flashlamps could also be incorporated into the structure as long as the plurality of flashlamps utilized are located at regular intervals around the centrally disposed laser component 22. In this manner, a balanced thermal condition is maintained within the central component such that bending and strains are not set up in the device which would tend to distort the output beam derived therefrom which in turn would adversely affect the output efficiency of the device.

In order to join the flashlamps to the central component 12, as well as to give the overall assembly mechanical protection and rigidity, a first layer 24 of a suitable metallic material of high light reflectivity and also good heat conduction, such as silver, is placed around the entire assembly. Superimposed over this initial layer 24 is a second layer 26 of appreciably heavier thickness of another suitable metallic material again having good heat conductivity such as copper. The combined effect of the layers 24 and 26 is to provide a means by which heat generated within the laser structure may be conducted to the surface of the device where it may be transferred to some cooling medium. Secondly, the internal layer 24 by providing good light reflectivity provides an efficient means of transferring a maximum of the light generated within the flashlamps 14 and 16 to the intermediate cladding material 32 wherein the energy contained in the pumping light is absorbed by the sensitizer ions. As has been stated hereinabove, the sensitizer ions then fluoresce and transfer their energy to the active ions disposed in the central laser component 22.

The construction according to the present invention has additional advantage over a construction in which the flashlamps become an integral part of the unitary structure in that upon failure of a flashlamp, the surrounding metallic material may be easily removed and the malfunctioning flashlamp replaced. In a totally integrated construction, failure of a flashlamp generally proves to be catastrophic to the performance of the assembly.

Although the present disclosure deals primarily with the utilization of erbium ions as the active laser material, it is within the purview of the invention that any other active laser ion may be utilized within the central laser core which requires a sensitizing cladding in a surrounding relationship thereto whether the requirement is based upon quenching of the active laser ion or simple absorption of the emitted laser energy by the sensitizing material.

A specific example of the construction according to the present invention has been built and tested and found to be effective. The compositions of the various glass materials used in the core 22, the intermediate cladding 32, and the outer cladding 13 are as given in the table hereinbelow.

| | Laser Component | Intermediate Cladding | Outer Cladding |
|---|---|---|---|
| $SiO_2$ | 59.83 | 60.7 | 70.5 |
| $LiO_2$ | 0.89 | 0.9 | — |
| $Na_2O$ | 6.42 | 6.5 | 8.9 |
| $K_2O$ | 9.71 | 9.9 | 7.9 |
| $CaO$ | — | — | 11.3 |
| $BaO$ | 4.28 | 4.3 | — |
| $ZnO$ | 1.34 | 1.4 | — |
| $Al_2O_3$ | 1.34 | 1.4 | 0.2 |
| $Sb_2O_3$ | 0.89 | — | 1.2 |
| $CeO_2$ | — | 1.9 | — |
| $Er_2O_3$ | 0.30 | — | — |
| $Yb_2O_3$ | 15.00 | 4.0 | — |
| $Nd_2O_3$ | — | 4.0 | — |
| $Y_2O_3$ | — | 5.0 | — |

While there has been shown and described what is considered to be a preferred embodiment of the present invention, it will be obvious to those skilled in the art that various changes and modifications may be made therein without departing from the invention.

I claim:

1. A rugged, unitary glass laser assembly of the type wherein a relatively thin, elongated, rod-like glass laser component having laser active ions therein is enclosed along all sidewall portions thereof in an outer cladding of a compatible glass material, at least two similarly elongated flashtubes are snugly positioned parallel to and at regular intervals around the laser component in elongated recesses in the outer cladding so that the flashtubes form a balanced array around the laser component essentially the entire length thereof, the improvement in which comprises an elongated annular sleeve of an intermediate cladding glass being interposed between the laser component and the outer cladding glass, the internal surface of the sleeve being disposed in intimate contacting relation with all parts of the sidewall portions of the laser component throughout the length thereof, the external surface of the sleeve being disposed in intimate contacting relation with all parts of the internal sidewall portions of the outer cladding glass throughout substantially the length thereof, the intermediate cladding glass having an index of refraction which is very nearly equal to that of the glass laser component, the intermediate cladding glass material being a host for sensitizing ions, the sensitizing ions being absorbant to energy at various wavelengths emitted by the flashtubes and fluorescent at wavelengths at which the laser active ions are absorbant, the outer cladding glass being transparent at those wavelengths at which the intermediate cladding glass is absorbant, and the glass laser component and the intermediate cladding glass being formed of the same base glass, $Y_2O_3$ being used as a dopant in the intermediate glass to balance thermal expansion coefficients for the glasses.

2. A laser assembly according to claim 1, wherein the glass laser component contains trivalent erbium active ions and trivalent ytterbium sensitizer ions and the intermediate cladding glass contains trivalent ytterbium and trivalent neodymium sensitizer ions.

3. A laser assembly according to claim 2, wherein the glass laser component, the intermediate cladding, and the outer cladding are formed from glasses having essentially the following compositions as given in weight percent:

|  | Laser Component | Intermediate Cladding | Outer Cladding |
| --- | --- | --- | --- |
| $SiO_2$ | 59.83 | 60.7 | 70.5 |
| $LiO_2$ | 0.89 | 0.9 | — |
| $Na_2O$ | 6.42 | 6.5 | 8.9 |
| $K_2O$ | 9.71 | 9.9 | 7.9 |
| CaO | — | — | 11.3 |
| BaO | 4.28 | 4.3 | — |
| ZnO | 1.34 | 1.4 | — |
| $Al_2O_3$ | 1.34 | 1.4 | 0.2 |
| $Sb_2O_3$ | 0.89 | — | 1.2 |
| $CeO_2$ | — | 1.9 | — |
| $Er_2O_3$ | 0.30 | — | — |
| $Yb_2O_3$ | 15.00 | 4.0 | — |
| $Nd_2O_3$ | — | 4.0 | — |
| $Y_2O_3$ | — | 5.0 | — |

* * * * *